US012030418B2

(12) United States Patent
Sato et al.

(10) Patent No.: US 12,030,418 B2
(45) Date of Patent: Jul. 9, 2024

(54) BOARDING AND ALIGHTING SUPPORT STRUCTURE FOR VEHICLE

(71) Applicant: TOYOTA JIDOSHA KABUSHIKI KAISHA, Toyota (JP)

(72) Inventors: Daisuke Sato, Susono (JP); Daisuke Ishii, Shizuoka-ken (JP); Hiroki Izu, Nagoya (JP); Hiroki Morita, Hiratsuka (JP); Kei Sato, Toyota (JP); Masaki Nanahara, Toyota (JP); Kazumi Serizawa, Toyota (JP); Hironobu Tanaka, Tokyo-to (JP); Shunsuke Mogi, Hachioji (JP); Takashi Hayashi, Nagoya (JP); Akihiro Kusumoto, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 354 days.

(21) Appl. No.: 17/510,659

(22) Filed: Oct. 26, 2021

(65) Prior Publication Data

US 2022/0126742 A1 Apr. 28, 2022

(30) Foreign Application Priority Data

Oct. 28, 2020 (JP) ................. 2020-180770

(51) Int. Cl.
*B60P 1/43* (2006.01)
*A61G 3/06* (2006.01)
*A61G 3/08* (2006.01)

(52) U.S. Cl.
CPC ............. *B60P 1/43* (2013.01); *A61G 3/061* (2013.01); *A61G 3/067* (2016.11); *A61G 3/0808* (2013.01)

(58) Field of Classification Search
CPC .......... B60P 1/43; A61G 3/067; A61G 3/061; A61G 3/0808
USPC ........................................... 280/163
See application file for complete search history.

(56) References Cited

U.S. PATENT DOCUMENTS

| 5,160,236 | A | * | 11/1992 | Redding | A61G 3/067 14/71.1 |
| 5,331,701 | A | * | 7/1994 | Chase | A61G 3/067 14/71.1 |
| 5,372,398 | A | * | 12/1994 | Aneiros | B60N 2/01583 296/65.13 |
| 5,676,515 | A | * | 10/1997 | Haustein | B60P 1/431 414/921 |

(Continued)

FOREIGN PATENT DOCUMENTS

| JP | S50-027268 U | 3/1975 |
| JP | 2003-285691 A | 10/2003 |

(Continued)

*Primary Examiner* — Hau V Phan
(74) *Attorney, Agent, or Firm* — Dinsmore & Shohl LLP

(57) ABSTRACT

A boarding and alighting support structure is applied to vehicle having a deck capable of boarding in a wheelchair. The boarding and alighting support structure includes a slope plate which projects obliquely from the boarding entrance end of the deck toward the ground, and a mounting member for installing the base portion of the slope plate at the boarding entrance end of the deck. The mounting member is configured to so that one end side is fixed to the base portion, other end is fixed to the entrance port end, and the one end side is flexibly configured with respect to the other end side.

11 Claims, 6 Drawing Sheets

(56) References Cited

U.S. PATENT DOCUMENTS

| | | | | |
|---|---|---|---|---|
| 6,179,545 | B1 * | 1/2001 | Petersen, Jr. | A61G 3/061 |
| | | | | 14/71.7 |
| 6,186,733 | B1 * | 2/2001 | Lewis | B60P 1/431 |
| | | | | 414/921 |
| 6,223,364 | B1 * | 5/2001 | Egan | A61G 3/062 |
| | | | | 5/81.1 R |
| 7,571,507 | B2 * | 8/2009 | Holicki | A61G 5/104 |
| | | | | 14/69.5 |
| 7,870,629 | B2 * | 1/2011 | Setzer, Jr. | B65G 69/30 |
| | | | | 14/71.3 |
| 9,271,883 | B2 * | 3/2016 | Johnson | B60P 1/433 |
| 9,390,451 | B1 * | 7/2016 | Slusar | G07C 5/0841 |
| D802,244 | S * | 11/2017 | Marshall | D34/32 |
| 10,253,464 | B2 * | 4/2019 | Lawson | E01D 18/00 |
| 11,806,861 | B2 * | 11/2023 | Sohmshetty | B25J 13/006 |
| 2014/0035245 | A1 * | 2/2014 | De Jong | B62B 3/002 |
| | | | | 280/79.3 |
| 2018/0312068 | A1 | 11/2018 | Aluchi et al. | |
| 2019/0383627 | A1 * | 12/2019 | Nangeroni | B60W 50/0098 |
| 2020/0010051 | A1 * | 1/2020 | Dumov | G06V 40/172 |
| 2020/0122642 | A1 * | 4/2020 | Sato | B60R 3/02 |

FOREIGN PATENT DOCUMENTS

| | | |
|---|---|---|
| JP | 2005-034506 A | 2/2005 |
| JP | 2015-023956 A | 2/2015 |
| JP | 2018-086992 A | 6/2018 |
| JP | 2018-187947 A | 11/2018 |

* cited by examiner

BOARDING AND ALIGHTING SUPPORT STRUCTURE FOR VEHICLE

CROSS-REFERENCE TO RELATED APPLICATION

The present application claims priority under 35 U.S.C. § 119 to Japanese Patent Application No. 2020-180770, filed Oct. 28, 2020, the contents of which application are incorporated herein by reference in their entirety.

BACKGROUND

Field

The present disclosure relates to a boarding and alighting support structure for vehicle, and in particular to the boarding and alighting support structure for transporting wheelchair occupants.

Background Art

Japanese Patent Application Laid-Open No. 2005-034506 discloses a technique relating to a wheelchair vehicle in which the boarding/alighting ability of the vehicle in the wheelchair is improved. In this technology, when getting on and off in a wheelchair, a slope plate is pulled out from a storage part under a floor according to a guide groove provided in a door of a vehicle. Then, the end of the slope plate contacts the ground and the base remains in the storage part. Therefore, the slope plate becomes a slope passed between the ground and the floor. Wheelchair occupants are supposed to get on or off into the cabin using such a slope plate.

SUMMARY

The wheelchair vehicle of JP-A-2005-034506 requires the operation of taking in and out the slope plate housed in the storage part under the floor by hand of a person. Therefore, for example, in a vehicle with driverless automatic traveling, it is a problem to secure a person to perform the operation of taking in and out the slope plate. Here, the operation of taking in and out the slope plate can be automated by existing techniques. However, when actuators are mounted for automation, an increase in vehicle weight and an increase in cost become problems. On the other hand, when the state of being pulled out without storing the slope plate, it will interfere with the traveling of the vehicle. Thus, in the slope structure for boarding and alighting for wheelchair occupants, compatibility between convenience in boarding and alighting and the drivability of vehicle becomes a problem.

The present disclosure has been made in view of the problems as described above, and an object thereof is to provide a boarding and alighting support structure for a vehicle capable of supporting the boarding and alighting of wheelchair occupants without impairing the drivability of the vehicle.

In order to solve the above-mentioned problems, a first disclosure is applied to a boarding and alighting support structure for vehicle having a deck capable of boarding in a wheelchair. The boarding and alighting support structure includes a slope plate extending obliquely toward a ground from an entrance/exit end of the deck, and a mounting member that attaches a base portion of the slope plate at the entrance/exit end of the deck. The mounting member is configured to so that one end side is fixed to the base portion, other end side is fixed to the entrance/exit end, and the one end side is bendable with respect to the other end side.

A second disclosure has the following further features in the first disclosure.

The mounting member is a plate-shaped rubber member.

A third disclosure further has the following features in the first disclosure.

The base portion of the slope plate is mounted so as to overlap an upper surface of the entrance/exit end.

A fourth disclosure has the following features in the first disclosure.

The slope plate is mounted at a position where height of an upper surface of the base portion is aligned with height of an upper surface of the entrance/exit end.

A fifth disclosure further has the following features in the first disclosure.

The boarding and alighting support structure further includes a regulating member that is configured to regulate a movable range of the slope plate. The regulating member is provided so as to span an end of the slope plate in a width direction and the deck.

A sixth disclosure further has the following features in the first disclosure.

The boarding and alighting support structure further includes a protective member provided so as to cover at least a part of an end of the slope plate in a width direction.

A seventh disclosure further has the following features in the first disclosure.

The slope plate has a width that is wider than a width between wheels of the wheelchair.

An eighth disclosure further has the following features in the first disclosure.

The boarding and alighting support structure includes concave shaped retaining grooves on the deck for fixing wheels of the wheelchair.

A ninth disclosure has the following features in the first disclosure.

The boarding and alighting support structure includes a movable handrail provided on the deck. The movable handrail is configured to be switchable between a form in which an approach path to the deck of the wheelchair is opened and a form in which the approach path is closed.

According to the first disclosure, the slope plate of the boarding and alighting support structure always functions as a slope. For this reason, an occupant using a wheelchair can board and alight on the deck through the slope plate without performing any special operation during boarding and alighting. Also, the slope plate may come into contact with obstacles while the vehicle is traveling. In the boarding and alighting support structure, when an obstacle comes into contact with the slope plate, the slope plate swings upward by the mounting member bends. As a result, it is possible to prevent the slope plate from coming into contact with the obstacle, thereby making it difficult to travel.

According to the third disclosure, the slope plate of the boarding and alighting support structure has a base overlapped with the upper surface of the entrance/exit end of the deck. According to such a structure, the load in the vertical direction input to the slope plate can be received by the deck. Thus, it is possible to reduce the load on the mounting member.

According to the fourth disclosure, it is possible to reduce the step between the base portion of the slope plate and the entrance/exit end portion. As a result, it is possible to improve the driving performance in the wheelchair.

According to the fifth disclosure, when the obstacle comes into contact with the slope plate, the regulating member can prevent the slope plate from swinging beyond the allowable range. Further, the regulating member assists the operation of returning to the original position after the slope plate swings. Further, the regulating member also serves to prevent the slope plate from being twisted beyond an allowable range.

According to the sixth disclosure, the configuration of the protective member can prevent damage to the obstacle or damage to the slope plate due to contact of the slope plate with the obstacle.

According to the eighth disclosure, the wheelchair can be secured by the configuration of the retaining grooves. This increases the safety of the occupants of the wheelchair while the vehicle is traveling.

According to the ninth disclosure, by moving the movable handrail, it is possible to secure the approach path when the wheelchair occupant is boarding. Also, when there is no wheelchair occupant, the movable handrail can be used as a handrail for a standing occupant.

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically.

Embodiment

1. Schematic Structure of Automated Traveling Pallet

Figure 1:
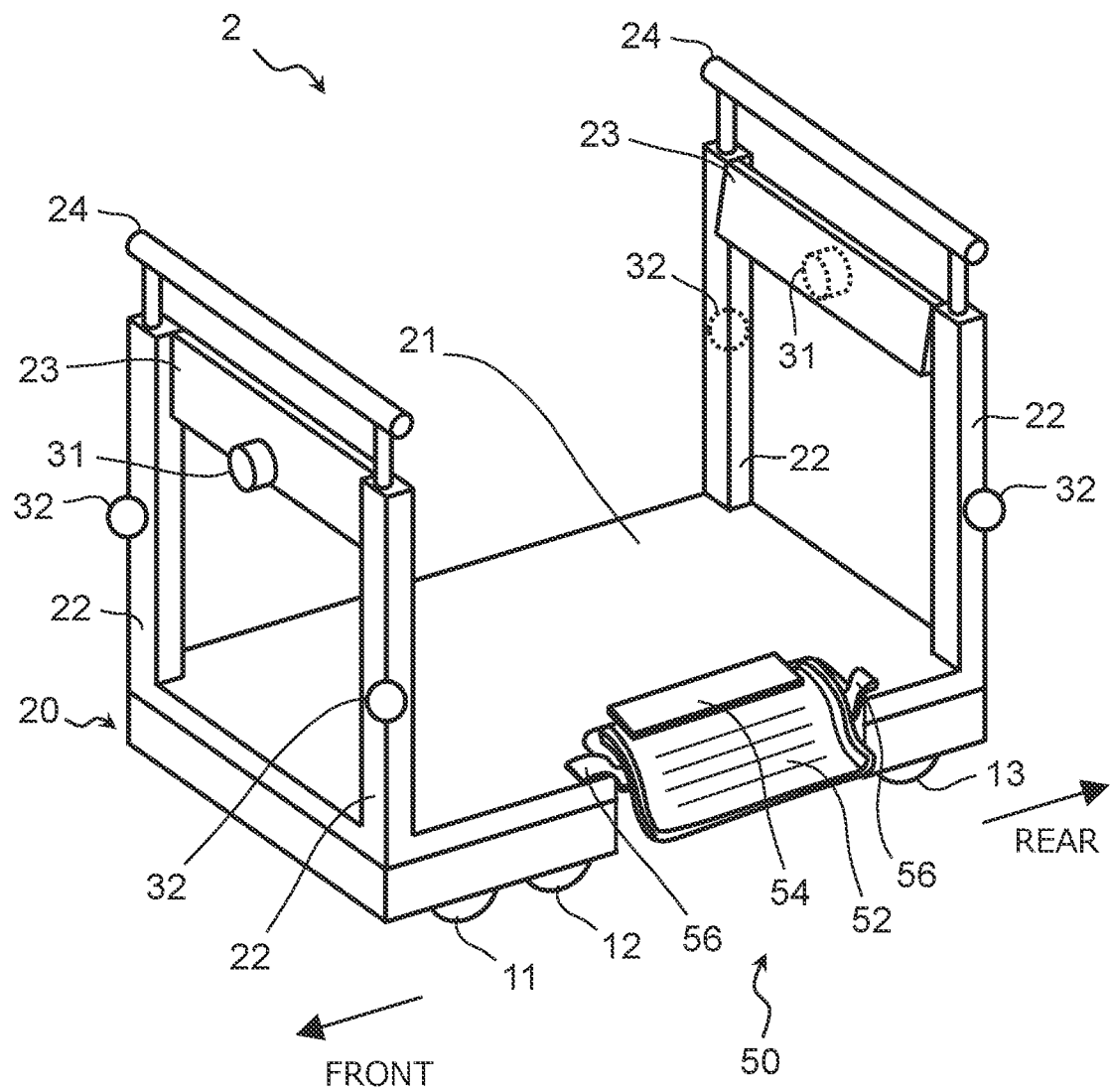
FIG. 1 is a perspective view showing a schematic structure of a vehicle to which a boarding and alighting support structure according to the present embodiment is applied.
Figure 2:
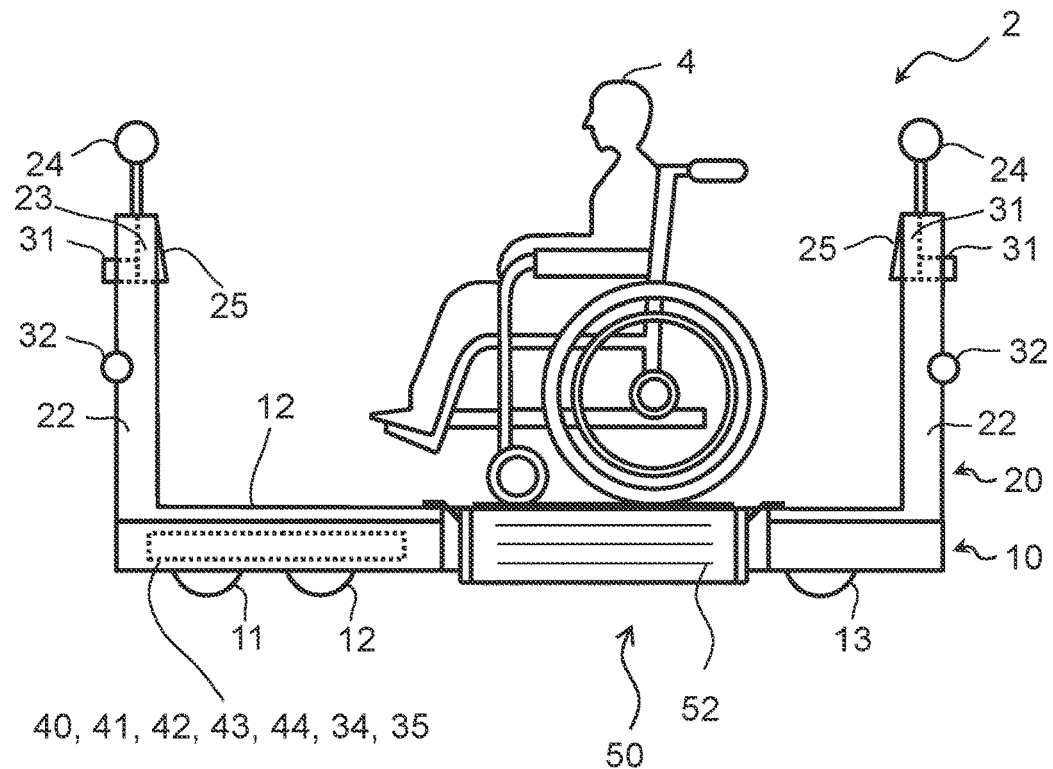
FIG. 2 is a side view of the vehicle shown in FIG. 1.

FIG. 1 is a perspective view showing a schematic structure of a vehicle to which a boarding and alighting support structure according to the present embodiment is applied. FIG. 2 is a side view of the vehicle shown in FIG. 1. A vehicle 2 according to the present embodiment is an automated traveling vehicle (cart) having a pallet-type vehicle body 20. In the following description, the automated traveling vehicle 2 according to the present embodiment is referred to as an automated traveling pallet. The automated traveling pallet 2 is used as a human-logistics vehicle for human transportation.

The automated traveling pallet 2 is a low-floor vehicle whose height of a deck 21 of the vehicle body 20 is about 30 [cm] from the ground. At the bottom of the vehicle body 20, front wheels 11, middle wheels 12, and rear wheels 13 are respectively provided on the left and right. These wheels 11, 12, 13 can make the automated traveling pallet 2 travel in either the front and rear direction in FIG. 1. Here, the front direction is assumed to be a basic traveling direction of the automated traveling pallet 2.

Support posts 22 are erected at the front and rear of the deck 21 on each side. A beam 23 is stretched between the left support post 22 and the right support post 22 at the front. Similarly, the beam 23 is stretched between the left support post 22 and the right support post 22 at the rear. The beams 23 can be used as a seat for occupants riding on the deck 21.

The space between the front and rear support posts 22 is open. The occupant can freely get on and off the deck 21 from between the front and rear support posts 22. The left and right sides of the deck 21 are opened, the automated traveling pallet 2 is excellent in passenger getting on and off to the deck 21.

The automated traveling pallet 2 has a boarding and alighting support structure 50 for supporting the boarding and alighting of an occupant 4 using a wheelchair. The boarding and alighting support structure 50 is a slope structure provided in an entrance/exit to the left side of the deck 21. Since the boarding and alighting support structure 50 is a characteristic configuration of the automated traveling pallet 2 of the present embodiment, a detailed description thereof will be described later.

Further, the automated traveling pallet 2 is provided with handrails 24 at both its front end and rear ends. That is, the automated traveling pallet 2 is a vehicle with handrails. These handrails 24 are provided for passengers to grip while riding. As an example, the handrail 24 is formed above the beam 23 so as to bridge between the two support posts 22 at each of the front and rear ends.

The automated traveling pallet 2 is provided with external sensors for autonomous traveling. A first external sensor is a LIDAR 31: Laser Imaging Detection and Ranging. The LIDAR 31 are provided on the front upper and rear upper portions of the automated traveling pallet 2 so as to respectively sense the front and rear of the automated traveling pallet 2. A second external sensor is a camera 32. The cameras 32 are provided on each support post 22 so as to capture the right front, left front, right rear, and left rear of the automated traveling pallet 2.

Next, a schematic structure of the vehicle body 20 and a chassis 10 of the automated traveling pallet 2 will be described. The front wheels 11, the middle wheels 12, and the rear wheels 13 are mounted on the chassis 10. Each wheel 11, 12, 13 is driven by an independent motor 44 (not shown) and can be rotated in a speed and direction independent of each other. Specifically, although the middle wheels 12 are normal wheels, while the front wheels 11 and the rear wheels 13 are omni-directional wheels. Only the middle wheel 12, which is a normal wheel, has a function of stopping the automated traveling pallet 2.

The chassis 10 includes a bogie (not shown) and a rocker (not shown). The front wheels 11 and the middle wheels 12 are supported by the bogie. Specifically, the motor 44 for driving the front wheels 11, and the motor 44 for driving the middle wheels 12 are mounted on the bogie. The bogie is swingably supported with respect to the rocker. The motor 44 for driving the rear wheel 13 is mounted on the rocker. Further, although not shown, a small battery having a high volume energy density, such as a lithium ion battery is mounted on the rocker. On top of the rocker, the vehicle body 20 is mounted via a spring (not shown) and a damper (not shown).

2. Configuration of Control System for Automated Traveling Pallet

Figure 3:
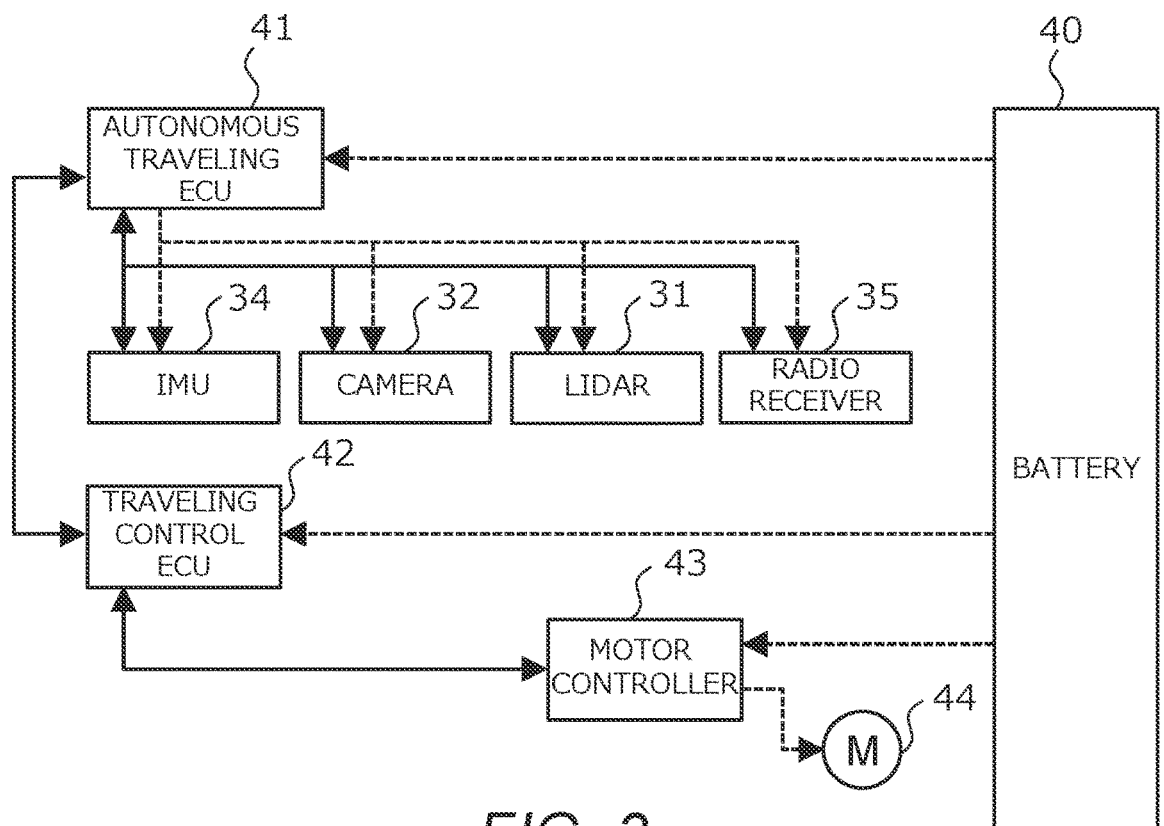
FIG. 3 is a diagram for explaining a configuration of a control system of the automated traveling pallet to which the boarding and alighting support structure according to the present embodiment is applied.

Next, the configuration of the control system of the automated traveling pallet 2 to which the boarding and alighting support structure according to the present embodiment is applied will be described with reference to FIG. 3. Two types of ECUs (Electronic Control Unit), i.e., an autonomous traveling ECU 41 and a traveling control ECU 42, are mounted on the automated traveling pallet 2.

The autonomous traveling ECU 41 is an ECU which controls the autonomous traveling of the automated traveling pallet 2. The autonomous traveling ECU 41 is connected to the LIDAR 31, the cameras 32, an IMU 34, and a radio receiver 35. The LIDAR 31 is used for detection and ranging of an object existing around the automated traveling pallet 2. The camera 32 is used to recognize objects present around the automated traveling pallet 2. The IMU (Inertial Measurement Unit) 34 is used to measure the angular velocity and acceleration of the three axes. The radio receiver 35 is used for vehicle-to-vehicle communication and road-to-vehicle communication utilizing the 920 MHz band. The autonomous traveling ECU 41 is supplied with power from a battery 40 mounted in the rocker. The power supply to the LIDAR 31, the cameras 32, the IMU 34, and the radio receiver 35 is provided by the autonomous traveling ECU 41.

The autonomous traveling ECU 41 has a function of communicating with the control servers by mobile communication such as 4G or 5G. The user of the automated traveling pallet 2 communicates with the control server using a user terminal, such as a smartphone or tablet PC, and transmits a desired departure point and a desired destination point to the control server. The control server selects an appropriate automated traveling pallet 2 from a plurality of available automated traveling pallets 2, and transmits the departure point and the destination point to the selected automated traveling pallet 2. The autonomous traveling ECU 41 creates a travel plan based on the departure point and the destination point received from the control server.

The autonomous traveling ECU 41 inputs a target trajectory calculated from the travel plan to the traveling control ECU 42. The traveling control ECU 42 generates a motor command value for traveling the automatically traveling pallet 2 along the target trajectory. Since the front wheels 11 and the rear wheels 13 are omni-directional wheels, it is possible to control the traveling direction along the target trajectory by controlling the difference in the rotational speed of the left and right motors 44. The motor command value generated by the traveling control ECU 42 is input to a motor controller 43. Further, the motor controller 43 is directly supplied with power from the battery 40. The motor controller 43 controls the power supply to the motors 44 of the left and right wheels 11, 12, and 13 according to the motor command value.

3. Features of Boarding and Alighting Support Structure

The features of the boarding and alighting support structure applied to the automated traveling pallet 2 according to the present embodiment will be described with reference to FIGS. 4 and 5.

Figure 4:
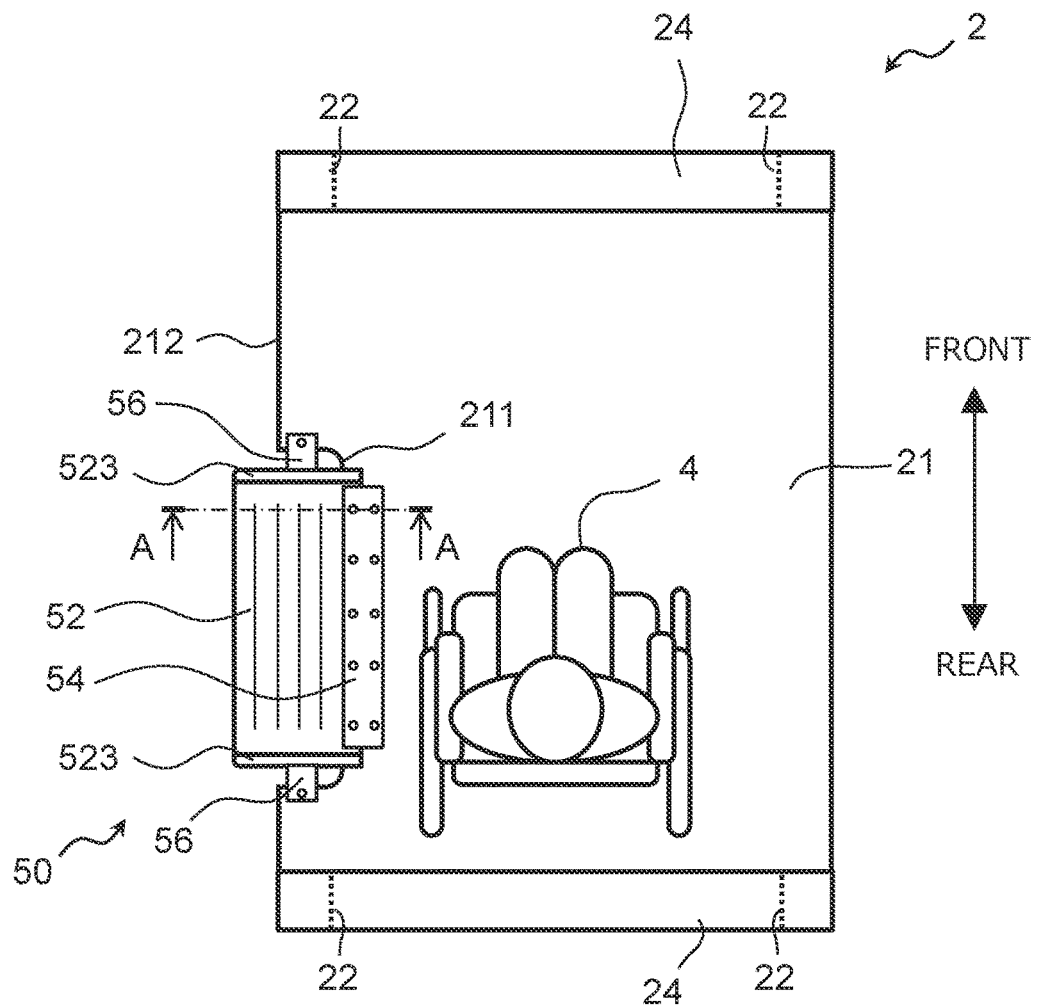
FIG. 4 is a plan view of the automated traveling pallet having the boarding and alighting support structure.

FIG. 4 is a plan view of the automated traveling pallet having the boarding and alighting support structure. Further, FIG. 5 is a schematic view of a cross section A-A obtained by cutting the boarding and alighting support structure of the automated traveling pallet shown in FIG. 4. The boarding and alighting support structure 50 includes a slope plate 52, a mounting member 54, a regulating member 56, and fixing members 58, 60.

The slope plate 52 is a slope that passes diagonally between an entrance/exit end 211 of the deck 21 and the ground. The slope plate 52 is made of a metal plate, for example. A base portion 521 overlaps the upper surface of the entrance/exit end 211. An end portion 522 extends obliquely toward the ground. However, the end portion 522 is not grounded to the ground. The gap h between the end portion 522 and the ground is set to, for example, about 10 [cm]. The width of the slope plate is set to, for example, 70 [cm] or more as a width larger than the width between wheels of the wheelchair.

Figure 5:
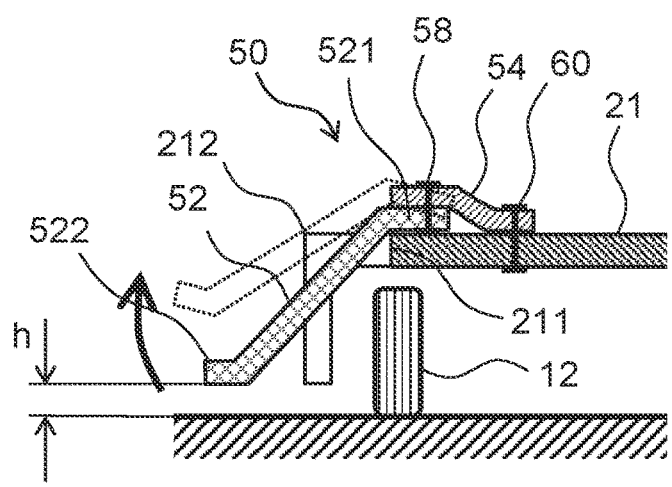
FIG. 5 is a schematic view of a cross section A-A obtained by cutting the boarding and alighting support structure of the automated traveling pallet shown in FIG. 4.

In the example shown in FIGS. 4 and 5, in order to reduce the amount of protrusion of the slope plate 52 in the vehicle width direction, the entrance/exit end 211 is offset in the vehicle width direction from the edge 212 toward the inside of the floor. However, there is no limitation on the offset amount here, it can be appropriately set according to the specifications and component configuration of the automated traveling pallet 2.

Protective members 523 are attached to each end of the slope plate 52 in the width direction. The protective member 523 is for preventing damage to the obstacle or damage to the slope plate 52 due to contact of the slope plate 52 with the obstacle, and is made of, for example, hard rubber. The configuration of the protective member 523 is not essential to the configuration of the slope plate 52. The range of attachment of the protective members 523 are not limited. For example, the protective members 523 may be attached to the entire area of the both end in the width direction of the slope plate 52, also may be a partial range thereof. In addition, the protective member 523 may be attached to the entire region or a partial region along the width direction of the end portion 522 of the slope plate 52.

The slope plate 52 is fixed to the entrance/exit end 211 of the deck 21 via the mounting member 54. The mounting member 54 is, for example, a rectangular plate-shaped hard rubber that can be bent freely. The mounting member 54 is fixed to the base portion 521 of the slope plate 52 and the deck 21. More specifically, the mounting member 54 is overlapped so that one end side covers an upper surface side of the base portion 521 of the slope plate 52. Then, to the extent that these two members overlap, both are fixed by a plurality of fixing members 58. The other end side of the mounting member 54 is fixed to the deck 21 by a plurality of fixing members 60. The fixing members 58 and 60 are exemplified bolts and nuts, pins, rivets, and the like. According to such a configuration, the slope plate 52 allows the end portion 522 to swing upward by bending one end side of the mounting member 54 against the other end side.

The regulating member 56 regulates the movable range of the slope plate 52. The regulating member 56 is composed of, for example, a stretchable rubber member. The regulating member 56 is mounted so as to connect the entrance/exit end 211 of the nearest deck 21 with the end in the width direction of the slope plate 52. The length of the regulating member 56 is set to a length that allows the slope plate 52 to move within the allowable range. When the slope plate 52 moves beyond the allowable range, a tensile force is generated in the regulating member 56. By the reaction force of the generated tensile force, the movement of the slope plate 52 is regulated to the allowable range.

The regulating member 56 is not an essential configuration of the boarding and alighting support structure 50. The material of the regulating member 56 is not limited to stretchable hard rubber, but may be, for example, a non-stretchable chain or other material.

According to the automated traveling pallet 2 having the boarding and alighting support structure 50 configured as described above, the following functions and effects can be achieved.

The slope plate 52 of the boarding and alighting support structure 50 always functions as a slope. Therefore, the occupant 4 using the wheelchair can board or alight the deck 21 through the slope plate 52 without performing any special operation at the time of boarding or alighting. Thereby, even if the automated traveling pallet 2 is driverless, the occupant 4 utilizing the wheelchair can perform boarding and alighting the deck 21 alone.

During the traveling of the automated traveling pallet 2, the slope plate 52 may come into contact with an obstacle. In the boarding and alighting support structure 50 according to the present embodiment, when the obstacle contacts the slope plate 52, the mounting member 54 bents, causing the slope plate 52 swings upward. As a result, it is possible to prevent the slope plate 52 from coming into contact with the obstacle and thus becoming difficult to travel.

When an obstacle contacts the slope plate 52, the restraining member 56 can prevent the slope plate 52 from swinging beyond an acceptable range. Further, the regulating member 56 assists the operation of returning to the original position after the slope plate 52 swings. Furthermore, the regulating member 56 also serves to prevent the slope plate 52 from being twisted beyond an allowable range.

In the slope plate 52 of the boarding and alighting support structure 50, the base portion 521 overlaps the upper surface of the entrance/exit end 211 of the deck 21. According to such a structure, it is possible to receive a load in the vertical direction input to the slope plate 52 by the deck 21, it is possible to reduce the load on the mounting member 54.

In the automated traveling pallet 2 of the present embodiment, the entrance/exit end 211 where the boarding and alighting support structure 50 is installed is offset from the edge 212 in the vehicle width direction toward the inside of the floor. According to such a configuration, it is possible to reduce the amount of protrusion in the vehicle width direction of the slope plate 52, it is possible to reduce the risk that the slope plate 52 is in contact with the obstacle.

4. Modified Example

The boarding and alighting support structure 50 applied to the automated traveling pallet 2 of the present embodiment may adopt a modified example as described below.

Figure 6:
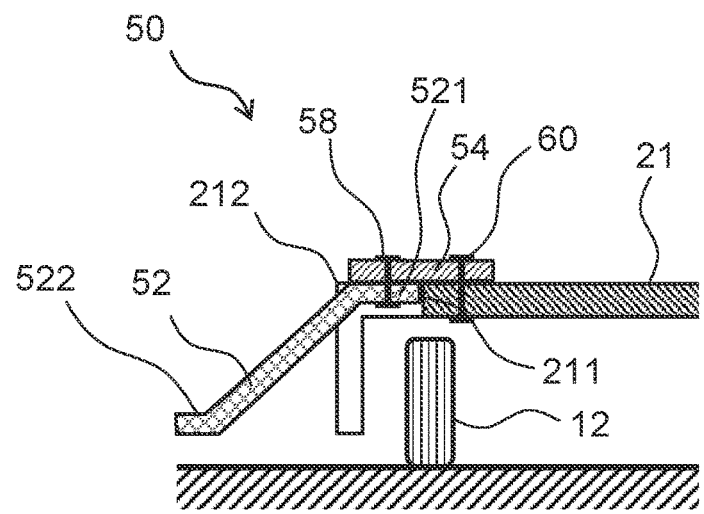
FIG. 6 is a schematic view of a cross section of the modified boarding and alighting support structure cut in cross section A-A in FIG. 4.

In the slope plate 52 of the boarding and alighting support structure 50, the base portion 521 may not overlap the upper surface of the entrance/exit end 211 of the deck 21. FIG. 6 is a schematic view of a cross section of the modified boarding and alighting support structure cut in cross section A-A in FIG. 4. In the example shown in FIG. 6, the height of the upper surface of the base portion 521 of the slope plate 52 is arranged side by side so as to be aligned with the upper surface and the height of the entrance/exit end 211 of the deck 21. According to such a configuration, it is possible to reduce the step between the base portion 521 and the entrance/exit end 211, it is possible to increase the travelability in the wheelchair.

The mounting member 54 is not limited to a hard rubber plate member as long as it has a structure in which the slope plate 52 is bent so as to be swingable in the vertical direction, and for example, a hinge structure may be employed.

The arrangement of the entrance/exit end 211 to which the boarding and alighting support structure 50 is attached is not limited. That is, the boarding and alighting support structure 50 may be provided, for example, in the entrance/exit to the right of the automated traveling pallet 2. Further, in the automated traveling pallet without the handrail 24 on the rear of the vehicle, the boarding and alighting support structure 50 may be attached to the entrance/exit at the rear of the vehicle.

Depending on the arrangement of the handrails provided on the deck 21, there is a possibility that the space for the occupants of the wheelchair to ride may not be secured. In the automated traveling pallet 2 having such a configuration, it may be provided with a movable handrail.

Figure 7:
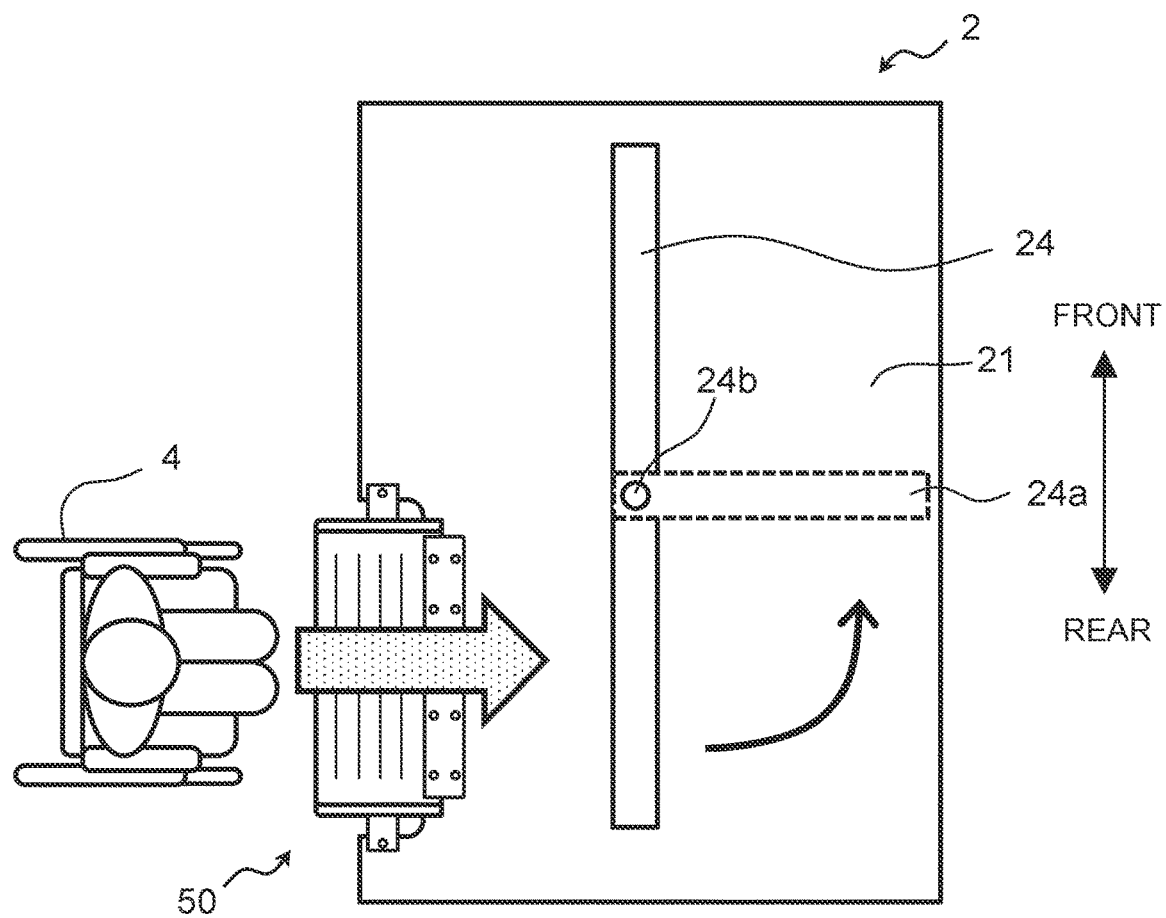
FIG. 7 is a plan view showing a modified example of the automated traveling pallet having the boarding and alighting support structure.

FIG. 7 is a plan view showing a modified example of the automated traveling pallet having the boarding and alighting support structure. In the example shown in FIG. 7, the handrail 24 is installed along the vehicle front-rear direction near the center of the vehicle width direction. Then, a movable handrail 24a of the rear side of the handrail 24 is configured to be movable 90 degrees in a counterclockwise around a movable shaft 24b. Here, for example, by releasing the lock mechanism (not shown), it is configured to be able to move the movable handrail 24a manually.

In the form where the movable handrail 24a is provided in a direction along the vehicle front-rear direction, an approach path for the wheelchair occupant 4 to enter the deck 21 from the slope plate 52 is closed by the movable handrail 24a. On the other hand, in the form in which the movable handrail 24a is rotated by 90 degrees in a counterclockwise direction around the movable shaft 24b, the approach path for the wheelchair occupant 4 to enter the deck 21 from the slope plate 52 is opened. According to such a structure, by switching these two forms, it is possible to secure an approach path when the occupant 4 of the wheelchair enters. In addition, when there is no wheelchair occupant 4, the movable handrail 24a can be used as a handrail for an occupant standing on board.

Figure 8:
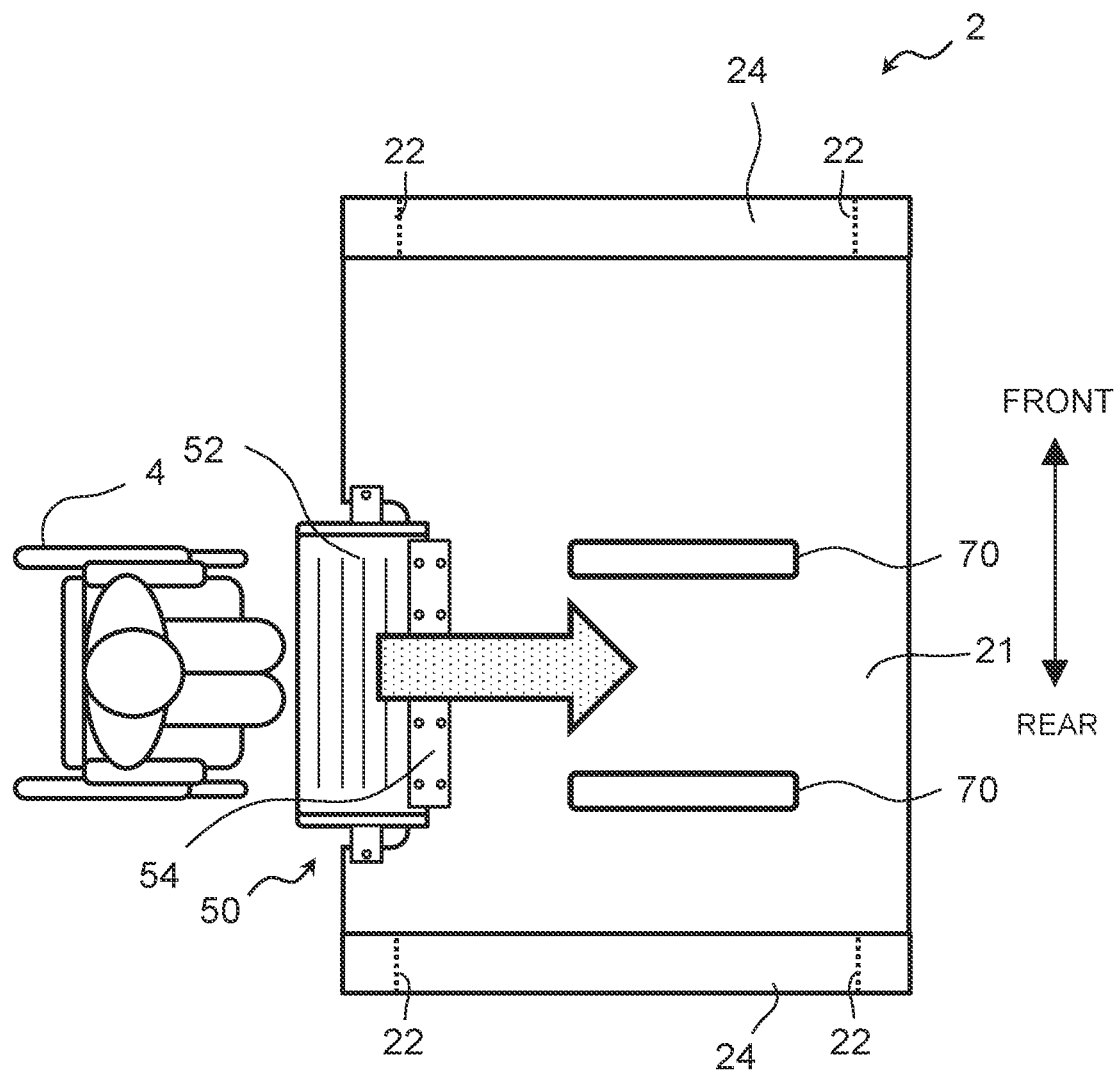
FIG. 8 is a plan view showing another modified example of the automated traveling pallet having the boarding and alighting support structure.

The deck 21 of the automated traveling pallet 2 may be provided with retaining grooves for fixing the wheels of the wheelchair of the occupant 4 to the riding position. FIG. 8 is a plan view showing another modified example of the automated traveling pallet having the boarding and alighting support structure. In the example shown in FIG. 8, two retaining grooves 70 are provided along the traveling direction of the wheelchair riding on the deck 21 through the slope plate 52 of the boarding and alighting support structure 50. The two retaining grooves 70 are grooves of the concave shape, and serves the function of fixing the wheels on guiding the wheelchair to the stop position. According to such a configuration, it is possible to fix the wheelchair, the safety during running is increased.

Figure 9:
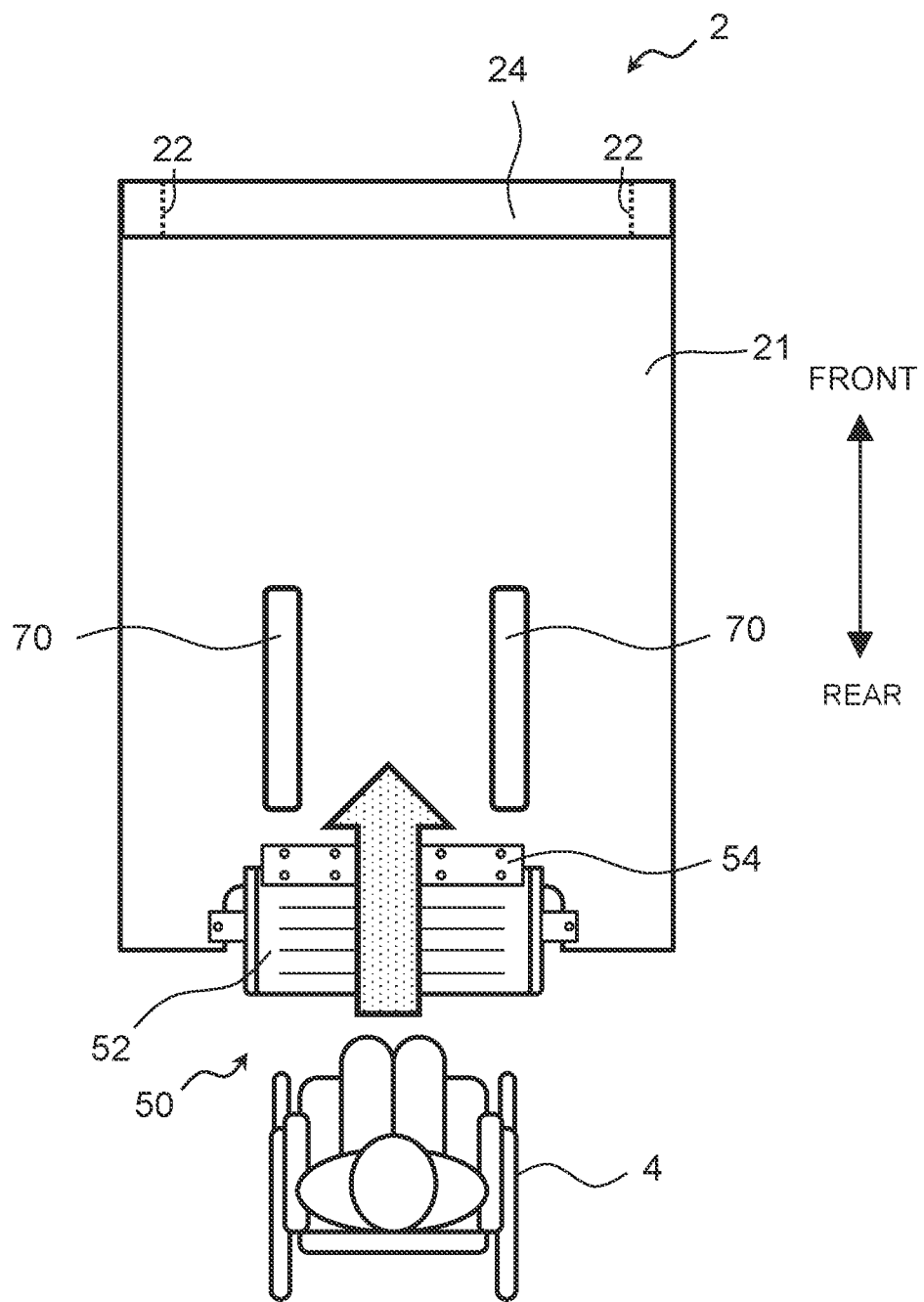
FIG. 9 is a plan view showing another example of retaining grooves of the automated traveling pallet having the boarding support structure.

FIG. 9 is a plan view showing another example of retaining grooves of the automated traveling pallet having the boarding support structure. In the example shown in FIG. 9, the boarding and alighting support structure 50 is installed on the rear side of the automated traveling pallet 2. Then, the two retaining grooves 70 are provided along the traveling direction of the wheelchair riding on the deck 21 from the vehicle rear through the slope plate 52 of the boarding and alighting support structure 50. With such a configuration, it is possible to fix the wheelchair, the safety during traveling is increased.

The automated traveling pallet 2 may include a fixing member for securing a wheelchair on the deck 21. As the fixing member, a belt is exemplified. According to such a configuration, it is possible to securely fix the wheelchair on which the vehicle is riding, so that safety during traveling is enhanced.

What is claimed is:

1. A boarding and alighting support structure for vehicle having a deck capable of boarding in a wheelchair, the boarding and alighting support structure comprising:
   a slope plate always extending obliquely toward a ground from an entrance/exit end of the deck; and
   a mounting member that attaches a base portion of the slope plate at the entrance/exit end of the deck,
   wherein, the mounting member is configured to so that one end side is fixed to the base portion,
   other end side is fixed to the entrance/exit end, and
   the one end side is bendable with respect to the other end side.

2. The boarding and alighting support structure for vehicle according to claim 1, wherein, the mounting member is a plate-shaped rubber member.

3. The boarding and alighting support structure for vehicle according to claim 1, wherein, the base portion of the slope plate is mounted so as to overlap an upper surface of the entrance/exit end.

4. The boarding and alighting support structure for vehicle according to claim 1, wherein, the slope plate is mounted at a position where height of an upper surface of the base portion is aligned with height of an upper surface of the entrance/exit end.

5. The boarding and alighting support structure for vehicle according to claim 1, further comprising a regulating member that is mounted so as to connect an end of the slope plate in a width direction with the deck, and is configured to regulate a movable range of the slope plate.

6. The boarding and alighting support structure for vehicle according to claim 1, further comprising a protective member provided so as to cover at least a part of an end of the slope plate in a width direction.

7. The boarding and alighting support structure for vehicle according to claim 1, wherein, the slope plate has a width that is wider than a width between wheels of the wheelchair.

8. The boarding and alighting support structure for vehicle according to claim 1, comprising concave shaped retaining grooves on the deck for fixing wheels of the wheelchair.

9. The boarding and alighting support structure for vehicle according to claim 1, comprising a movable handrail provided on the deck,
   wherein, the movable handrail is configured to be switchable between a form in which an approach path to the deck of the wheelchair is opened and a form in which the approach path is closed.

10. The boarding and alighting support structure for vehicle according to claim 1, wherein, the slope plate is mounted so that an end portion of the slope plate is not grounded to the ground.

11. A boarding and alighting support structure for vehicle having a deck capable of boarding in a wheelchair, the boarding and alighting support structure comprising:
   a slope plate extending obliquely toward a ground from an entrance/exit end of the deck; and
   a mounting member that is a plate-shaped rubber member that attaches a base portion of the slope plate at the entrance/exit end of the deck,
   wherein one end side of the mounting member is fixed to the base portion, other end side of the mounting member is fixed to the entrance/exit end, and the one end side of the mounting member is bendable with respect to the other end side of the mounting member.

* * * * *